US012048061B2

(12) United States Patent
Barry et al.

(10) Patent No.: US 12,048,061 B2
(45) Date of Patent: Jul. 23, 2024

(54) DISCOVERING AN EMBEDDED SUBSCRIBER IDENTIFICATION MODULE ROOT DISCOVERY SERVICE ENDPOINT

(71) Applicant: GOOGLE LLC, Mountain View, CA (US)

(72) Inventors: Aguibou Barry, Mountain View, CA (US); Jean-Philippe Paul Cormier, London (GB)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 18/344,761

(22) Filed: Jun. 29, 2023

(65) Prior Publication Data

US 2023/0345228 A1 Oct. 26, 2023

Related U.S. Application Data

(63) Continuation of application No. 17/348,865, filed on Jun. 16, 2021, now Pat. No. 11,696,116.

(60) Provisional application No. 63/039,955, filed on Jun. 16, 2020.

(51) Int. Cl.
H04W 8/18 (2009.01)
H04W 4/50 (2018.01)
(52) U.S. Cl.
CPC .............. *H04W 8/183* (2013.01); *H04W 4/50* (2018.02)
(58) Field of Classification Search
None
See application file for complete search history.

(56) References Cited

U.S. PATENT DOCUMENTS 10,194,313 B1  1/2019  Karimli
2018/0070224 A1  3/2018  Park et al.
2018/0146364 A1  5/2018  Coureau et al.
(Continued)

FOREIGN PATENT DOCUMENTS

WO  WO 2019235804  12/2019

OTHER PUBLICATIONS

Office Action issued Feb. 16, 2023 in Indian Patent Application No. 202247068686, with concise English translation.
(Continued)

*Primary Examiner* — Gary Lafontant
(74) *Attorney, Agent, or Firm* — Oblon, McClelland, Maier & Neustadt, L.L.P.

(57) ABSTRACT

A memory device includes at least one memory cell array block and a control logic. The memory cell array block includes multiple layers of memory cells and word line layers provided corresponding to individual layers of memory cells. The memory cell array block is divided into at least two memory cell array subblocks, each subblock comprising a number of layers of memory cells and word line layers provided corresponding to individual layers of memory cells. The control logic is coupled to the memory cell array block, and configured to: erase, read or program the memory cell array block using a block mode or a subblock mode, and when the memory cell array block is erased, read, or programmed under the subblock mode, determine, at least based on a state of one of the two memory cell array subblocks, an operation strategy of the other memory cell array subblock.

20 Claims, 10 Drawing Sheets

(56) References Cited

U.S. PATENT DOCUMENTS

2019/0140837 A1    5/2019    Cheng et al.
2019/0159016 A1*  5/2019    Zhang .................. H04W 8/183

OTHER PUBLICATIONS

International Search Report and Written Opinion for the related International Application No. PCT/US2021/037565, Dated. Sep. 2, 2021, 397 pages.

GSM Association: "GSMA EID Definition and Assignment Process Version 1.0 Draft 7 May 28, 2020 Security Classification: Non confidential", ITU-T Draft; Study Period 2017-2020; Study Group 2, International Telecommunication Union, Geneva: CH vol. ties/2 May 28, 2020 (May 28, 2020), pp. 1-12, X P044293923, Retrieved from the Internet: URL:https://www.itu.int/ifa/t/2017/sg2/docs/200527/td/ties/gen/T 7-<http:i/www.itu.int/ifa/ti2017 /sg2/docs/200527 /td/ties/gen/T17-> SG02-200527-TD-GEN-1092IIZIP-E.zip TD1092-GSMA-LS27 Att.docx.

GSM Association, GSM Association, GSMA Floor2 the Walbrook Building 25 Wallbrook London, UK, Jun. 10, 2019 (Jun. 10, 2019), XP040719639, p. 241, line 1.

Office Action issued Mar. 26, 2024 in Korean Patent Application No. 10-2022-7037819, with concise English translation.

* cited by examiner

| PEP key | PEP ext | EID prefix | SM-DS FQDN list |
|---|---|---|---|
| TAC_A | 00 | STM 0123456789 | ds.gsma.com<br>ds.cn |
| TAC_A | 01 | EUM#2 | ds.google.com |
| TAC_B | 00 | EUM#1 | ds.gsma.com |
| 3PA_C | 00 | [need direct query to ds.cpa.com to get the EID prefix] | ds.c.3pa.com |
| 3PA_D | 00 | EUM#3 | ds.d.3pa.com |

FIG. 3

DISCOVERING AN EMBEDDED SUBSCRIBER IDENTIFICATION MODULE ROOT DISCOVERY SERVICE ENDPOINT

CROSS REFERENCE TO RELATED APPLICATIONS

This U.S. Patent Application is a continuation of U.S. patent application Ser. No. 17/348,865, filed on Jun. 16, 2021, which claims priority under 35 U.S.C. § 119(e) to U.S. Provisional Application 63/039,955, filed on Jun. 16, 2020. The disclosures of the prior applications are considered part of the disclosure of this application and are hereby incorporated by reference in their entirety.

TECHNICAL FIELD

This disclosure relates to discovering an embedded subscriber identification module (eSIM) root discovery service endpoints.

BACKGROUND

Telephony devices, such as cellular phones and tablets, include subscriber identification modules (SIM) that are used by service operators, i.e., a mobile network operator (MNO) or virtual MNO (MVNO), to identify and authenticate network subscribers. When a subscriber purchases a new embedded SIM (eSIM)-enabled device, the eSIM-enabled device needs to obtain an eSIM profile (also referred to as a subscription profile) for operating the device on a network of the service provider. Currently, the Global System for Mobile Communications Association (GSMA) defines a procedure for obtaining eSIM profiles that requires the eSIM-enabled device to access a central server, referred to as a Subscription Manager—Discovery Server (SM-DS), to check for to see if an eSIM profile is available for the device by providing their globally unique eSIM ID. If available, the SM-DS will redirect the eSIM-enabled device to an appropriate subscription manager (SM) server to download the eSIM subscription. Industry trends, however, are moving toward the original equipment manufacturers (OEMs) of eSIM-enabled devices using their own discovery servers, leaving the service providers with the responsibility of determining which discovery server they need to register available eSIM profiles with so that the appropriate discovery server can redirect the eSIM-enabled devices to their SM server to obtain the eSIM profile. This is burdensome for the service providers to keep track of which eSIM-enabled devices are associated with which OEMs to determine the appropriate discovery server.

SUMMARY

One aspect of the disclosure provides a computer-implemented method that when executed on data processing hardware causes the data processing hardware to perform operations. The operations include receiving a request to provision an embedded subscriber identity module (eSIM) profile to an eSIM-enabled device. The request includes a proxy eSIM identifier (EID) prefix. The eSIM profile is associated with a service provider of a mobile communication service a user of the eSIM-enabled device subscribes to. The operations also include determining whether the proxy EID prefix includes an address of a target discovery server the eSIM-enabled device is configured to connect to. When the proxy EID prefix includes an address of the target discovery server, the operations also include extracting the address of the target discovery server from the proxy EID prefix. Using the address of the target discovery server extracted from the proxy EID prefix, the operations also include registering a discovery event with the target discovery server. The discovery event indicates that the service provider has reserved the eSIM profile to the proxy EID or an actual EID assigned to the eSIM-enabled device.

Implementations of the disclosure may include one or more of the following optional features. In some implementations, determining whether the proxy EID prefix includes the address of the target discovery server includes determining whether the proxy EID prefix encodes a fully qualified domain name of the target discovery server. In other implementations, determining whether the proxy EID prefix includes the address of the target discovery server includes determining whether the proxy EID includes a compression of a fully qualified domain name of the target discovery server. In these implementations, the compression of the fully qualified domain name includes a compressed IPv6 address.

The target discovery server may be operated by a manufacturer of the eSIM-enabled device. Additionally or alternatively, the service provider may include a mobile network operator (MNO) or a mobile virtual network operator (MVNO).

In some examples, when the proxy EID prefix does not include the address of the target discovery server, the operations further include: accessing a proxy EID to EID conversion table to resolve the address of the target discovery server from the proxy EID prefix; and using the address of the target discovery server resolved from the proxy EID prefix by accessing the proxy EID to EID conversion table, registering the discovery event with the target discovery server. The data processing hardware may reside on a service provider server associated with the service provider. The service provider service may include a profile server configured to provision and reserve the eSIM profile for the proxy EID or the actual EID assigned to the eSIM-enabled device. In some implementations, the profile server includes a Subscription Manager (SM), a Subscription Manager Data Preparation (SM-DP), a Subscription Manager Data Preparation Plus (SM-DP+), a Subscription Manager Secure Routing (SM-SR), a Profile Delivery Platform, or a Profile Delivery Server.

Another aspect of the disclosure provides a system that includes data processing hardware and memory hardware storing instructions that when executed on the data processing hardware cause the data processing hardware to perform operations. The operations include receiving a request to provision an embedded subscriber identity module (eSIM) profile to an eSIM-enabled device. The request includes a proxy eSIM identifier (EID) prefix. The eSIM profile is associated with a service provider of a mobile communication service a user of the eSIM-enabled device subscribes to. The operations also include determining whether the proxy EID prefix includes an address of a target discovery server the eSIM-enabled device is configured to connect to. When the proxy EID prefix includes an address of the target discovery server, the operations also include extracting the address of the target discovery server from the proxy EID prefix. Using the address of the target discovery server extracted from the proxy EID prefix, the operations also include registering a discovery event with the target discovery server. The discovery event indicates that the service provider has reserved the eSIM profile to the proxy EID or an actual EID assigned to the eSIM-enabled device.

Implementations of the disclosure may include one or more of the following optional features. In some implementations, determining whether the proxy EID prefix includes the address of the target discovery server includes determining whether the proxy EID prefix encodes a fully qualified domain name of the target discovery server. In other implementations, determining whether the proxy EID prefix includes the address of the target discovery server includes determining whether the proxy EID includes a compression of a fully qualified domain name of the target discovery server. In these implementations, the compression of the fully qualified domain name includes a compressed IPv6 address.

The target discovery server may be operated by a manufacturer of the eSIM-enabled device. Additionally or alternatively, the service provider may include a mobile network operator (MNO) or a mobile virtual network operator (MVNO).

In some examples, when the proxy EID prefix does not include the address of the target discovery server, the operations further include: accessing a proxy EID to EID conversion table to resolve the address of the target discovery server from the proxy EID prefix; and using the address of the target discovery server resolved from the proxy EID prefix by accessing the proxy EID to EID conversion table, registering the discovery event with the target discovery server. The data processing hardware may reside on a service provider server associated with the service provider. The service provider service may include a profile server configured to provision and reserve the eSIM profile for the proxy EID or the actual EID assigned to the eSIM-enabled device. In some implementations, the profile server includes a Subscription Manager (SM), a Subscription Manager Data Preparation (SM-DP), a Subscription Manager Data Preparation Plus (SM-DP+), a Subscription Manager Secure Routing (SM-SR), a Profile Delivery Platform, or a Profile Delivery Server.

The details of one or more implementations of the disclosure are set forth in the accompanying drawings and the description below. Other aspects, features, and advantages will be apparent from the description and drawings, and from the claims.

DESCRIPTION OF DRAWINGS

FIG. 3 is a schematic view of an example proxy EID to EID conversion table.

FIGS. 4A-4D are schematic views of example operations performed by a service provider server for resolving an address of a target discovery server that an eSIM-enabled device connects to.

Like reference symbols in the various drawings indicate like elements.

DETAILED DESCRIPTION

Telephony devices, such as cellular phones, watches, and tablets, include embedded subscriber identification modules (eSIM) that are used by a service provider, e.g., mobile network operator (MNO) or mobile virtual network operator (MVNO), to identify and authenticate network subscribers. When a subscriber purchases a new device, the device needs to download an eSIM profile (also referred to as a subscription profile or an operational profile) from a profile server associated with the service provider for operating the device on a network of the service provider. Conventionally, a service provider activates a new device on its network using a procedure defined by the Global System for Mobile Communications Association (GSMA) in which the service provider informs a central root discovery service, e.g., a Subscription Manager—Discovery Server (SM-DS), that an eSIM profile is available for the new device having a globally unique eSIM identifier (EID). Thus, a new device may simply access the root discovery service and provide the EID, whereby the root discovery service may use the EID to redirect the device to a profile server for downloading the eSIM profile to complete device activation. In this scenario, the service provider simply generates a new eSIM profile at the profile server for the new device and provides the pairing of the address of the profile server holding the eSIM profile and the EID that uniquely identifies the device to the root discovery server operated by the GSMA so that the root discovery server can redirect the device to the profile server upon recognition of the EID. The recent emergence of original equipment manufacturers (OEMs) launching their own root discovery services other than the GSMA have left service providers without the ability to determine which root discovery server is the target discovery server that their profile server needs to contact for EID-based activation.

Implementations herein are directed toward assigning new eSIM-enabled telephony devices with proxy EIDs for use by service providers in identifying appropriate OEM-based discovery servers to contact so that the telephony devices can be redirected to the prescribed profile server for downloading corresponding eSIM profiles for activation. As will become apparent, a service provider may use a proxy EID uniquely assigned to an eSIM of a new telephony device to uniquely identifies the new telephony device. The proxy EID additionally functions as a discovery service-based identifier that a service provider server uses to identify the appropriate target discovery server 150 that the telephony device will be first contacting during activation of the device. As used herein, the terms target discovery service, target root discovery service, and OEM-based discovery service are used interchangeably.

Figure 1A:
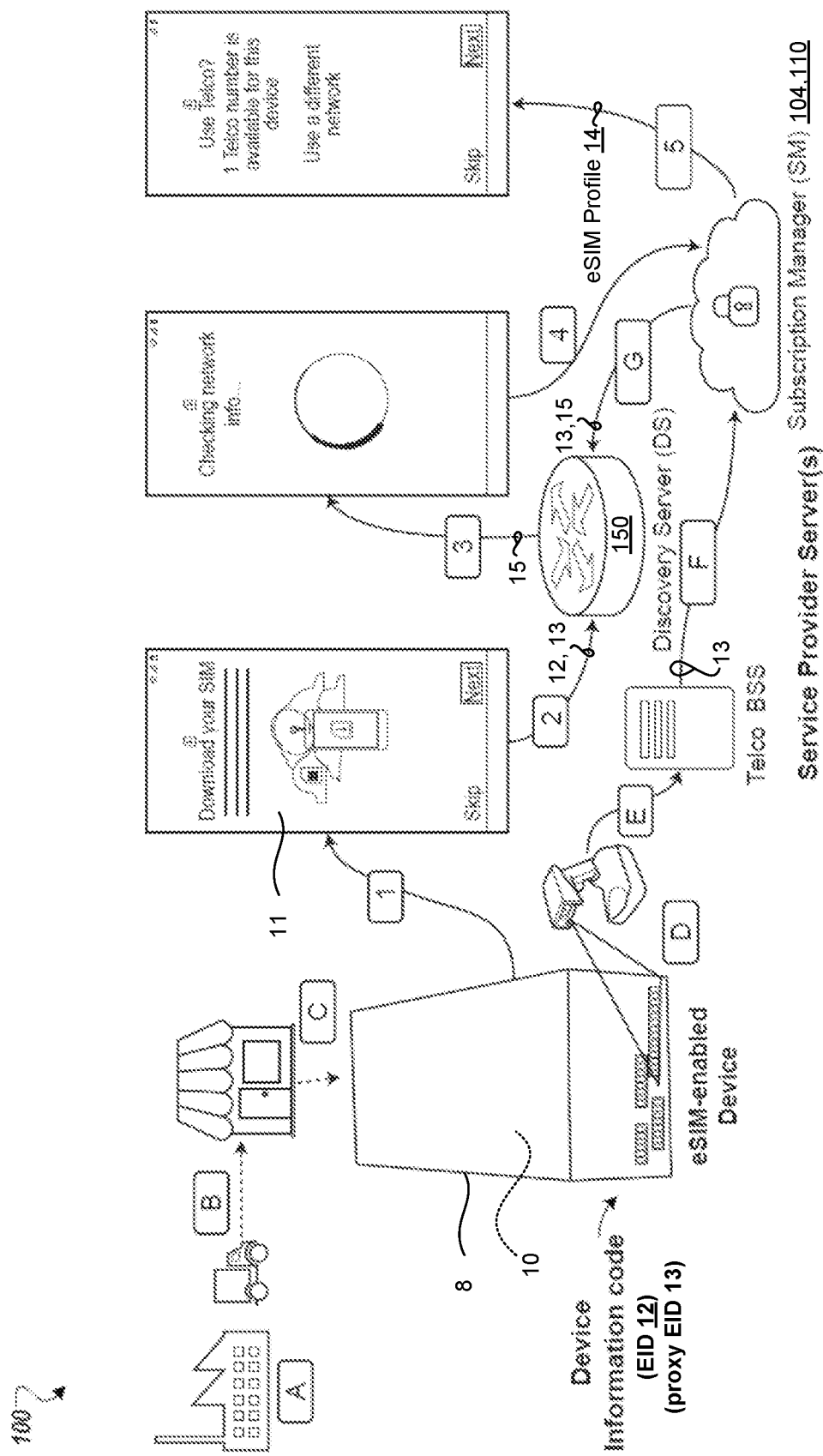
FIGS. 1A and 1B are schematic views of example discovery server-based activation procedures for activating a new eSIM-enabled telephony device.
Figure 1B:
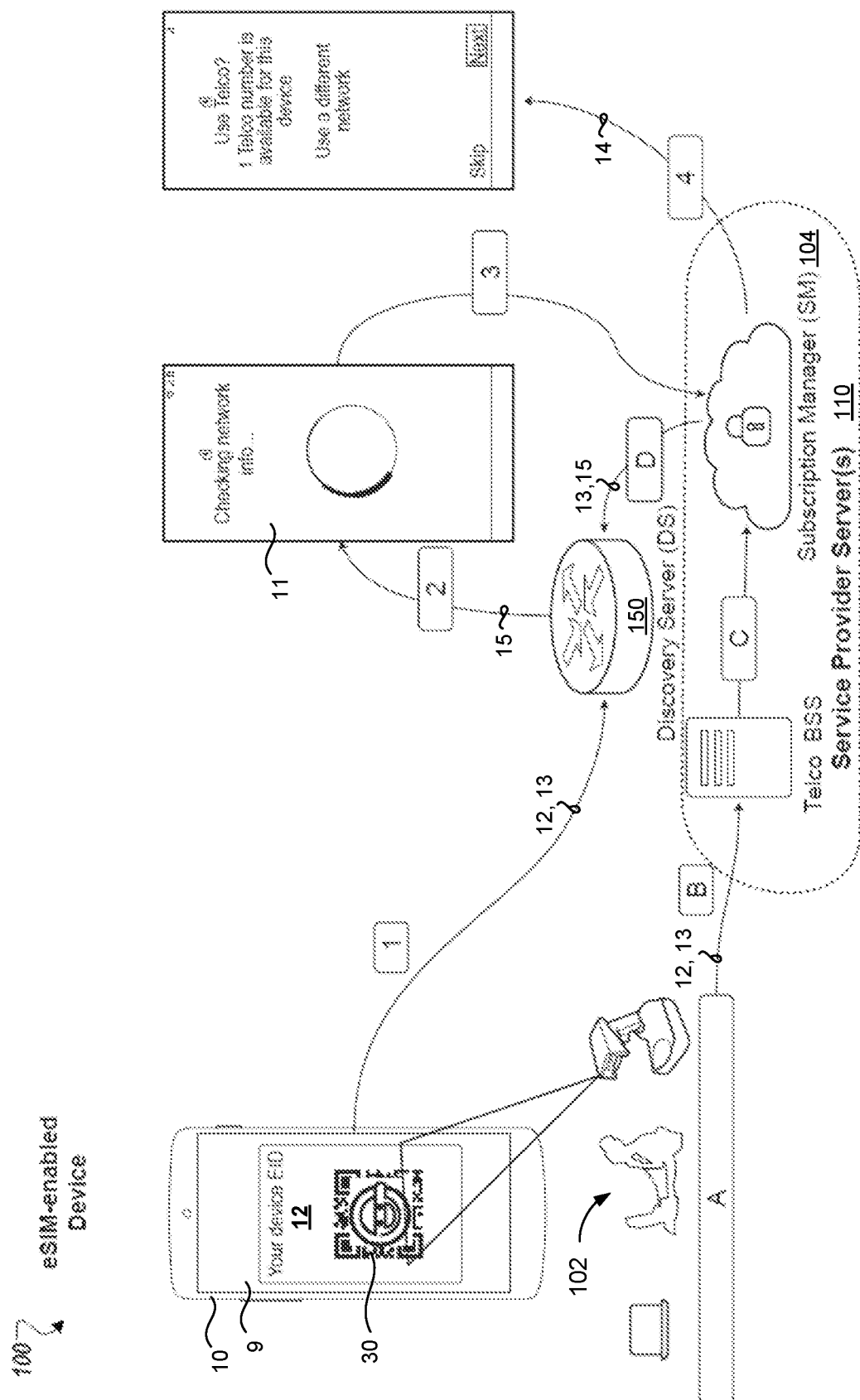

FIGS. 1A and 1B are schematic views of example discovery server-based activation procedures 100 for activating a new eSIM-enabled telephony device (also referred to as "device") 10 on an operator network of a given service provider (e.g., MNO or MVNO) 102. As used herein, activating the device 10 includes the device 10 downloading an eSIM profile 14 from a profile server 104 associated with the service provider 102. The eSIM profile 14 is authorized by the service provider 102 in order to access the operator network. The profile server 104 is configured to generate and provide the eSIM profile 14 for use by the device 10 on the operator network. For instance, the device 10 may be associated with a customer (new or existing) of the service provider 102 and use the device 10 to access the operator network when the service provider 102 authorizes the respective eSIM profile 14 downloaded from the profile server 104. The profile server 104 may be a Subscription Manager (SM), a Subscription Manager Plus (SM+), a Subscription Manager Data Preparation (SM-DP), a Subscription Manager Data Preparation Plus (SM-DP+), a Subscription Manager Secure Routing Plus (SM-SR+), a Profile Delivery Platform, Profile Delivery Server, or any other server or combination of servers capable provisioning eSIM profiles. The service provider 102 may include multiple profile servers 104.

The device 10 may include a smart phone, smart watch, tablet, or other computing device having cellular capabilities. An original equipment manufacturer (OEM) of the device 10 configures the device with a specific address for a target discovery server 150 operated by the OEM—opposed to a centralized discovery server maintained and operated by the GSMA. In some examples, the device 10 is manufactured for a particular region of the world, whereby the OEM may launch and support one or more root discovery servers in each region. Further, the device 10 is provisioned with a unique eSIM identifier (EID) 12 that uniquely identifies the device 10. In some examples, when the profile server 104 reserves an eSIM profile 14 for the device 10, the profile server 104 registers a discovery event to the target discovery server 150 by registering a pairing between the EID (or EID prefix) 12, 13 and an address of the profile server 104.

In some implementations, a proxy EID 13 is assigned to the device 10 for resolving an address of a target discovery server 150 associated with the OEM that the device 10 is configured to connect to. The proxy EID 13 includes a proxy EID prefix 13, 13p that functions as the discovery server-based identifier. The proxy EID prefix 13p is unique to the eSIM-enabled device 10 and assigned to the eSIM-enabled device 10 by the OEM of the device 10 so that the proxy EID prefix 13p is paired with a corresponding discovery server 150 operated by the OEM and the EID 12 of the device 10. In an example, the address of the target discovery server 150 includes a target SM-DS fully qualified domain name (FQDN), such as "aRootDs.com", that points to the target discovery server 150. Accordingly, a service provider server 110 may execute a discovery server endpoint resolver (DSER) routine to obtain the address of the target discovery server 150 the device 10 will connect directly from the proxy EID 13 assigned to the device 10. The proxy EID 13 may be derived from the actual EID 12 by replacing the EID prefix (which may include the portion of the actual EID that indicates the issuer of the eSIM) with a proxy EID prefix 13p, whereby the proxy EID prefix 13p includes information for resolving the address of the target discovery server 150. Here, the service provider server 110 can provision the eSIM profile 14 to the appropriate subscription manager (e.g., SM-DP+) 104 and register a discovery event to the target discovery server 150 for redirecting the device 10 to the subscription manager 104 for downloading the eSIM profile 14. The service provider server 110 may include a profile server (e.g., subscription manager) 104 or some other server associated with the service provider.

In other implementations, when the proxy EID does not include the address of the target discovery server the device is configured to connect to, the service provider server executes the DSER routine resolve the address of the target discovery server from the proxy EID prefix by accessing a proxy EID to EID conversion table. Here, the DSER routine may use the table to convert or translate the proxy EID prefix 13p into a FQDN that points toward the target discovery server (e.g., a target SM-DS) 150. Upon the service provider server 110 using the FQDN to register a discovery event to the target discovery server 150, the target discovery server 150 may subsequently return the correct EID prefix 13p back to the service provider server 110 so that the eSIM profile 14 can be provisioned by the appropriate subscription manager (e.g., SM-DP+) 104 associated with the service provider 102. Here, the service provider server 110 can provision the eSIM profile 14 to the appropriate subscription manager (e.g., SM-DP+) 104 and instruct the target discovery server 150 to direct the device 10 to that subscription manager 104 for downloading the eSIM profile 14.

FIG. 1A depicts the device 10 packaged in box 8 and delivered by the OEM of the device to a retail shop in which an end user purchases the device from the retail shop. The retail shop may include a non-operator channel. Steps 1-5 depict steps that the device performs to activate the device 10 on the operator network during the discovery server-based activation procedure, while steps A-G depict steps that the service provider 102 performs. More specifically, steps A-D depict steps performed by the service provider 102 prior to commencement of the discovery server-based activation, such as the OEM assigning the device 10 with a specific address of the target discovery server 150 operated by the OEM (Step A), shipping the device 10 to a retail establishment (Step B), an agent of the retail establishment selecting the boxed device 8, 10 from inventory (Step C), and a service provider agent scanning (Step D) a device information code (or EID) 12 from the box 8 of the device 10. In some examples, the end user purchases the device 10 from a retail shop not affiliated with the service provider 102 and then brings the purchased device 10 to the service provider 102 to activate the device. The device information code 12 may include the proxy EID 13 or other globally-unique identifier assigned to the device. Steps E-G on the other hand, depict the steps the service provider 102 performs as part of the discovery server-based activation procedure in which the service provider server 110 receives the scanned device information code (Step E), executes the DSER routine to resolve the address of the target discovery server (e.g., SM-DS FQDN) from the device information code 12, 13 (Step F), and registers the discovery event to the target discovery server 150 (Step G) by providing the target discovery server 150 with the device information code 12, 13 paired with an address 15 of the profile server 104 (e.g., SM-DP+) having the available eSIM profile 14 for the device 10 to download. Between Steps F and G, the service provider server determines that the eSIM of the device is eligible to receive an eSIM profile 14 compatible with device capabilities of the device 10 and then performs profile download preparation and subscription activation process with the profile server (e.g., subscription manager) 104. For example, the profile server 104 may receive relevant information (SM-DS FQDN/address, contract identifier, signed service provider authentication token, etc.) for registering the discovery event to the target discovery server 150. The profile server 104 may additionally receive the device-specific information (e.g., EID and/or prefix EID) 12, 13 for the process of downloading the eSIM profile 14. Notably, the service provider server 110 may perform steps A-G while the device is offline.

During Step 1, a user of the device 10 unboxes the device purchased from the retail shop and initiates the activation process for downloading an available eSIM profile provisioned by the service provider 102 to permit operation by the device on the operator network of the service provider. Here, the user may power on the device and the device may display a graphical user interface 11 that guides the user through the activation process for downloading the eSIM profile 14. For example, the device 10 may execute an application that displays the graphical user interface 11 or the device may connect to a web-based application displaying the graphical user interface 11. In response to a user input indication indicating consent by the user to commence the activation process, the device connects to the target discovery server 150 (Step 2). Here, the user provides the device information code 12, 13 that uniquely identifies the device to the target discovery server 150 to check if the eSIM on the device is eligible to receive the eSIM profile 14 compatible with capabilities of the device. For example, the target discovery server 150 may determine that the device information code 12, 13 provided by the user matches the device information code 12, 13 of the discovery event registered by the service provider server 110 to the target discovery server 150 at Step G. Upon the discovery server 150 identifying the available eSIM profile 14 by matching the device information code 12, 13 to the registered discovery event, the target discovery server 150 obtains and returns the address 15 of the profile server (SM-DP+) 104 to redirect the device 10 to the profile server 104. The device then checks for the eSIM profile 14 at the profile server (Step 4), and if available, downloads the eSIM profile 14 form the profile server (Step 5) 104 to complete remote SIM provisioning of the user device 10.

By contrast to the discovery server-based activation procedure of FIG. 1A in which the device is powered-off and offline, FIG. 1B depicts the discovery server-based activation procedure while the device 10 is powered-on and online. Here, the user may have purchased the device 10 anywhere and simply powers-on the device to initiate the activation procedure. Steps 1-5 depict steps that the device 10 performs to activate the device on the operator network during the discovery server-based activation procedure, while Steps A-D depict steps that the service provider performs. More specifically, step A depicts a step performed by the service provider 102 prior to commencement of the discovery server-based activation in which the service provider 102 scans the device information code (or EID or proxy EID) 12.13 displayed on a screen 9 of the device 10. Here, a quick response (QR) code 30 or other unique graphic may be scanned to obtain the device information code (or EID or proxy EID) 12, 13. Alternatively, an agent of the service provider 102 may access a device settings menu to obtain the device information code 12, 13. Steps B-D on the other hand, depict the steps the service provider 102 performs as part of the discovery server-based activation procedure in which the service provider server 110 receives the device information code (Step B) 12, 13, executes the DSER routine to resolve the address of the target discovery server (e.g., SM-DS FQDN) from the device information code (Step C), and registers the discovery event to the target discovery server 150 (Step D) by providing the target discovery server 150 with the device information code 13 paired with an address 15 of the profile server (e.g., SM-DP+) 104 having the available eSIM profile 14 for the device to download. Between Steps C and D, the service provider server 110 determines that the eSIM of the device is eligible to receive an eSIM profile 14 compatible with device capabilities of the device and then performs profile download preparation and subscription activation process with the profile server (e.g., subscription manager) 104. For example, the profile server 104 may receive relevant information (SM-DS FQDN/address, contract identifier, signed service provider authentication token, etc.) for registering the discovery event to the target discovery server 150. The profile server 104 may additionally receive the device-specific information (e.g., EID or proxy EID) for the process of downloading the eSIM profile 14.

Steps 1-4 performed by the device 10 in FIG. 1B are substantially similar to Steps 2-5 performed by the device in FIG. 1A. However, at Step 1 in FIG. 1B, the device displays the EID 12 assigned to the device, or displays a QR code 30 or other unique graphic that may be selected to initiate the activation procedure by connecting to the target discovery server 150 and provide the device information code (EID or proxy EID) 12, 13 to the target discovery server 150.

Figure 2:
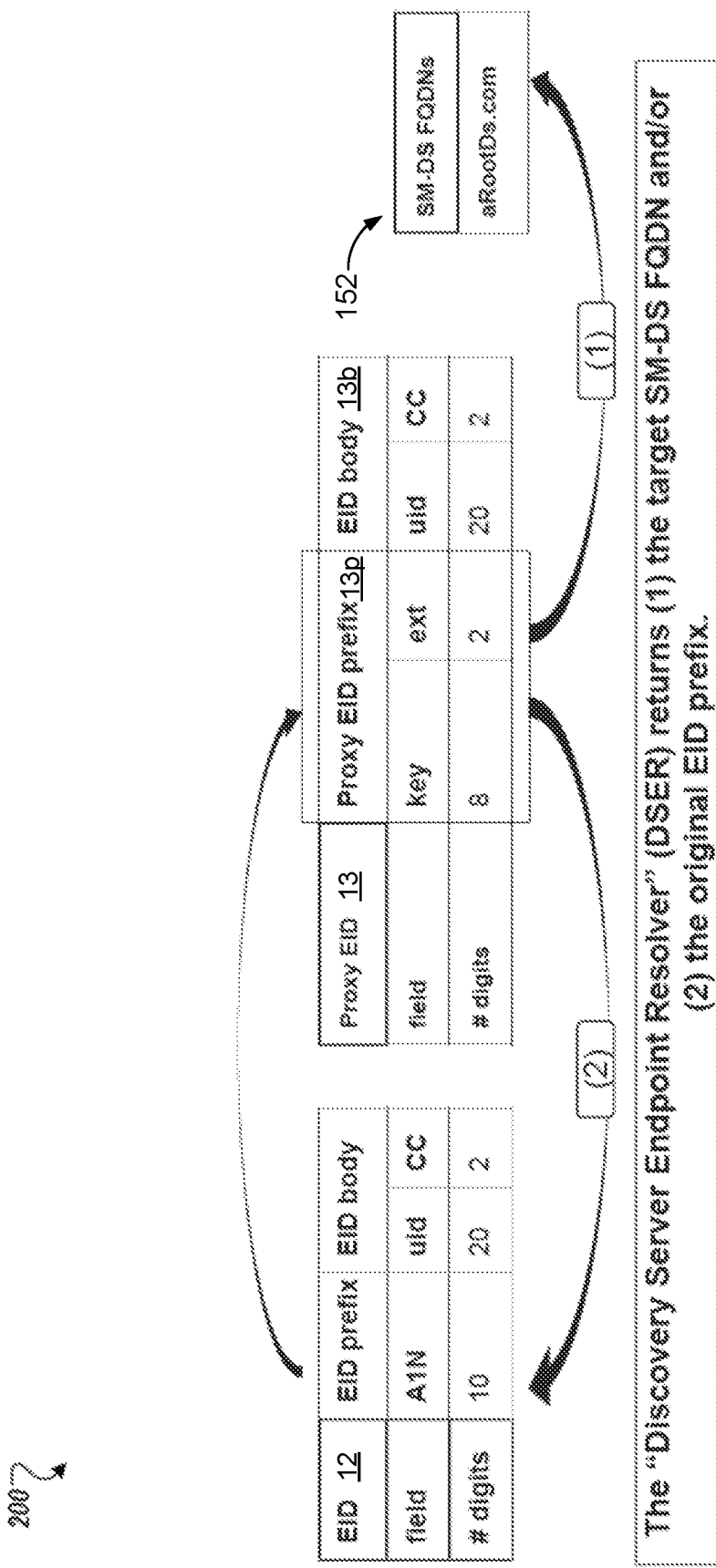
FIG. 2 is a schematic view of an example proxy EID defined to resolve an address of a target discovery server.

FIG. 2 provides a schematic view 200 of an example proxy EID 13 defined to resolve an address 152 (e.g., FQDN) of a target discovery server 150. The proxy EID 13 is derived from the actual EID 12. As mentioned previously, the EID is a globally-unique identifier assigned to the eSIM of the device. Generally, the EID 12 is a very long number (e.g., EID 89049032005008882600033452944865) rendering the EID challenging for a user to read while displayed on a graphical user interface, let alone dictate to a customer care agent or retail representative. In the example shown, the EID 12 may include EID prefix and body portions. The EID prefix may include a single field with, for example, 10 digits, while the EID body portion may include a first field with 20 digits and a second field with two (2) digits. The proxy EID 13 includes a proxy EID prefix 13p configured to replace the EID prefix portion of the original EID. The proxy EID 13 includes a body portion 13b identical to the EID body portion of the original EID 12. Here, the proxy EID prefix 13p is exemplified to include two fields: a key field with eight (8) digits and an ext field with two (2) digits. The service provider server 110 may execute the DSER routine to resolve the address 152 of the target discovery server (e.g., SM-DS FQDN) from the proxy EID prefix 13p. For instance, the DSER routine may resolve only the address of the target discovery server (e.g., aRootDs.com) and then the service provider server 110 must query the target discovery server 150 with the EID body (identical between the proxy EID and the original EID) to obtain the original EID prefix. In other examples, the DESR routine resolves both the address 152 of the target discovery server 150 and the actual EID prefix.

The DESR routine may resolve the address of the target discovery server using one of three methods depending on the information the proxy EID prefix provides. In scenarios when the service provider server 110 receives a proxy EID prefix 13p that does not encode, or otherwise provide, the address 152 of the target discovery server 150, the DESR routine uses the first method by accessing a proxy EID 13 to EID conversion table to obtain the address 152 of the target discovery server 150. For example, the service provider server 110 upon receiving the proxy EID prefix 13p can determine whether the proxy EID prefix 13p includes an encoded or compressed FQDN address 152 of the target service provider 150. FIG. 3 provides an example proxy EID to EID conversion table 300 having two proxy EID prefix (PEP) columns, an EID prefix column, and target discovery server address column. An OEM may generate a set of unique PEPs associated with a target discovery server 150 operated by the OEM such that each of the PEPs point to a same address (e.g., FQDN) 152 associated the target discovery server 150. The table 300 may thus include multiple sets of unique PEPs with each set associated with a corresponding target discovery server 150 and address 152 thereof. Here, each row represents a respective PEP assigned to a corresponding eSIM-enabled device having a globally-unique EID. The PEP columns include a PEP column and a PEP ext column in which the PEP key indicates a manufacturer of the device that can be used to identify a corresponding target discovery server operated by the manufacturer.

The EID prefix column indicates the EID prefix assigned to each corresponding eSIM-enabled device, whereby the EID prefix in each row corresponds to one of the PEPs assigned to a respective eSIM-enabled device along with the corresponding address of the target discovery server (e.g., SM-DS FQDN) the device will contact for activating the device. Thus, when the DESR routine cannot obtain the address of the target discovery server directly from the EID prefix, the DESR routine may access the proxy EID to EID conversion table 300 to resolve the address. The table 300 may be publically available and actively maintained. The service provider server 300 may always access the table 300 so that the DESR routine can resolve the address of a target discovery server from only the proxy EID prefix assigned to a given eSIM-enabled device.

In additional implementations, the DESR routine resolves the address of the target discovery server using the second method when the address of the target discovery server is encoded in the proxy EID prefix using Decimal ASCII. Here, the address of the target discovery server may be encoded using a value converted from a Decimal ASCII table. For example, if the address is the FQDN of "rds.co", the Decimal ASCII may use values from 65-90 to designate capital letters A-Z and values from 97-122 to designate lower case letters a-z. Capital letters may be used for saving a number of digits in the EID prefix (minimum of 6-digits). Continuing with the example, capitalized "RDS.CO" would be encoded as "82 68 83 46 67 79" into the proxy EID prefix. Accordingly, upon receiving the proxy EID prefix, the DESR routine executing at the service provider server may extract the encoded proxy EID prefix of 826883466779 and use the ASCII table to convert the extracted proxy EID prefix into the corresponding address of the target discovery server. Accordingly, the service provider server (i.e., at the profile server) may use the resolved FQDN address to register the discovery event to the appropriate target discovery server.

The DESR routine uses the third method to conduct a reverse DNS-like approach on the received proxy EID prefix when the received proxy EID prefix is formatted as a compressed IPv6 Address prefix. Here, the target discovery service obtains IPv6 addresses prefix (e.g., 2620:0:800/40) and creates a DNS record associating 2620:0:800:1IPV6 address with an address (e.g., FQDN) of the target discovery server. In the example, the proxy EID prefix is 40-bit long and the value provided by the device is "262000000800". Thus, the DESR routine receives and converts the proxy EID prefix (e.g., 262000000800) into the IPV6 address by adding zeroes to the remaining 87 bits and 1 to the last bit, to thereby provide 2620:0:800::1. Thereafter, the DESR routine executes a reverse DNS look-up function to extract the address (e.g., FQDN of the target discovery server. Accordingly, the service provider server (i.e., at the profile server) may use the resolved FQDN address to register the discovery event to the appropriate target discovery server.

FIGS. 4A-4D are schematic views of example state diagrams 400 a-d operations performed by a service provider server 110 during the DESR routine for resolving an address 152 of a target discovery server 150 that an eSIM-enabled device 10 connects to. The vertical y-axis in each of FIGS. 4A-4D indicates time increasing from top to bottom. The eSIM-enabled device includes the eSIM (e.g., eUICC) 42 technology that allows the device to download an eSIM profile 14 (also referred to as "carrier profile" or "subscription profile" or "operational profile") to permit the device to operate on a network of a service provider (e.g., MNO or MVNO) 102 without having a physical SIM card. Thus, the eSIM 42 enables remote SIM provisioning (RSP) of the device by the service provider 102. The device also includes a local profile assistant (LPA) 44 that resides on the device as a standalone, system app for managing SIM profiles on the eSIM (i.e., eUICC chip). Specifically, the LPA serves as a bridge between remote service provider servers, including a profile server/subscription manager (SM-DP+) that prepares, stores, and delivers eSIM profiles to devices) and the eUICC chip. The service provider server 110 is associated with the service provider and may include an MNO or MVNO server 106 and the profile server (e.g., SM-DP+) 104. The profile server 104 is configured to generate and reserve the eSIM profile 14 to the EID 42 associated with the device 10. In the examples shown, the SM-DS corresponds to the target discovery server 150 operated by the manufacturer of the eSIM-enabled device 10.

Figure 4A:
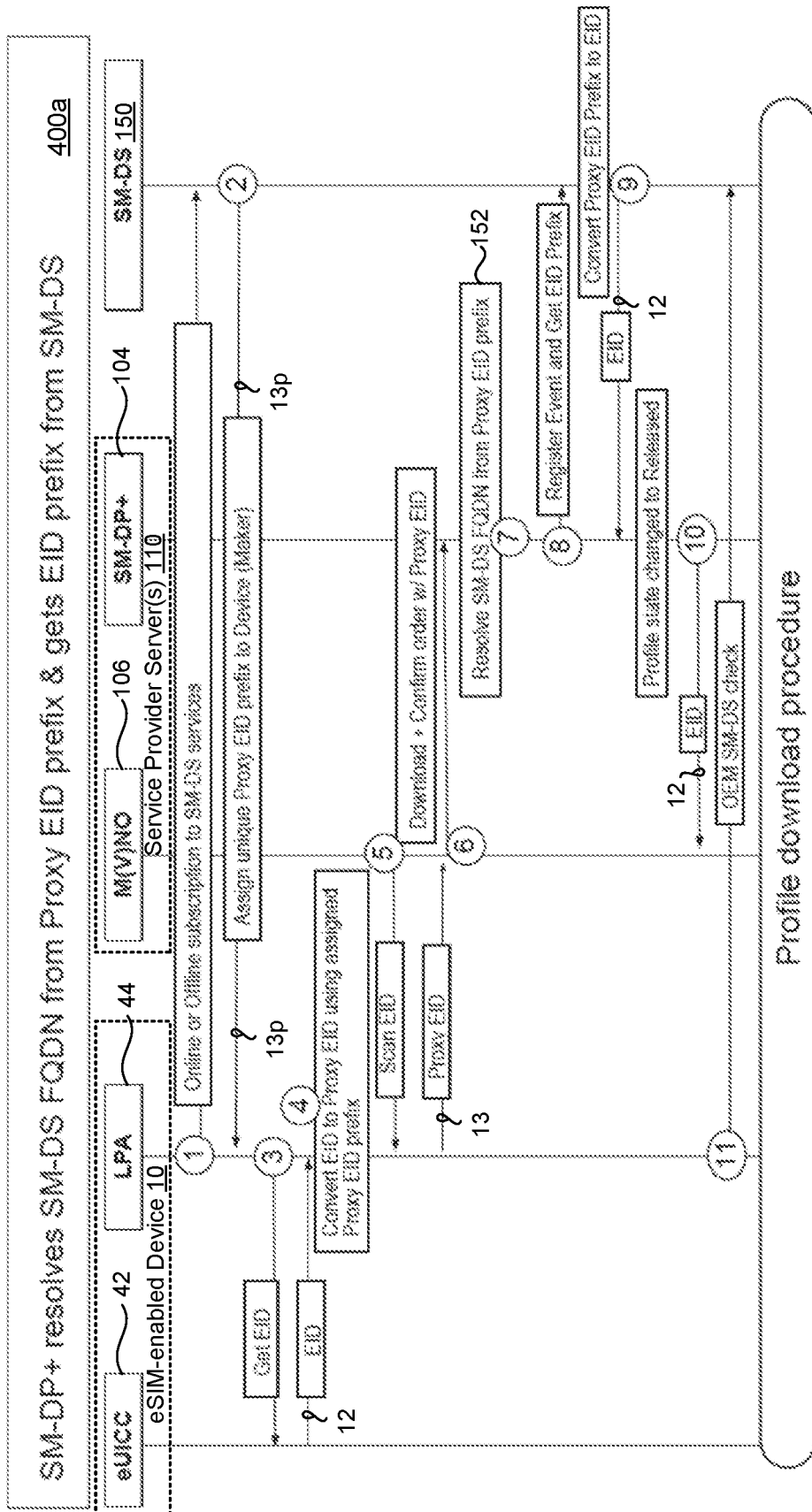

Referring to FIG. 4A, the service provider server 110 executes the DESR routine to resolve the address 152 of the target discovery server 150 from the proxy EID prefix 13p and then obtains the actual EID prefix from the target discovery server 150. The server provider server 110 includes data processing hardware 610 (FIG. 6) and memory hardware 620 (FIG. 6) in communication with the data processing hardware 610 and storing instructions that when executed on the data processing hardware 610 to perform operations. At time 1, the LPA 44 of the eSIM-enabled device 10 subscribes to services of the target discovery server (SM-DS) 150 operated by the manufacturer of the eSIM-enabled device 10, and at time 2, the target discovery server 150 assigns a unique proxy EID prefix 13p to the eSIM-enabled device. Thus, the target discovery server 150 operated by the OEM of the device may generate unique proxy EID prefixes that may be assigned to eSIM-enabled devices manufactured by the OEM. This may occur while the device is offline. In other examples, the target discovery server 150 generates and assigns the unique proxy EID prefix 13p when the device is powered-on and online.

At time 3, the LPA 44 queries the eSIM (eUICC) 42 to obtain the globally-unique EID 12 assigned to the eSIM 42, and at time 4, converts the EID 12 to a corresponding proxy EID 13 using the unique proxy EID prefix 13p assigned by the target discovery server 150. Here, since the proxy EID 13 includes a same EID body portion as the actual EID 12, the conversion can simply include the proxy EID prefix 13p replacing the prefix portion of the actual EID 12. Accordingly, when the device 10 is purchased and an end user wants to activate the device on a carrier network of the service provider 102, the service provider server 110 can request the EID 42 from the LPA 44 and receive the proxy EID 13 converted therefrom from the LPA 44 at time 5. At time 6, the MNO server 106 of the service provider server 110 uses the proxy EID 13 to issue a download and confirm order with the profile server (SM-DP+) 104. Here, the profile server 104 is configured to reserve the eSIM profile 14 to the proxy EID 13. At time 7, the profile server (SM-DP+) 104 executes the DESR routine to resolve only the address 152 of the target discovery server 150 from the proxy EID prefix 13p. The DESR routine may use one of the three methods discussed above depending on the information included in the proxy EID prefix 13p. At time 8, the profile server 104 contacts the target discovery server 150 using the resolved address 152 to register a discovery event with the target discovery server 150. The discovery event (as shown in step G of FIG. 1A and step D of FIG. 2A) may specify the address 15 of the profile server 104 paired with the proxy EID 13. Here, the profile server 104 may also query the target discovery server 150 with the body portion 13 b of the proxy EID 13 to obtain the original EID prefix. Thus, at time 9, the target discovery server 150 may convert the proxy EID prefix into the actual EID 12 and provide the actual EID 12 back to the profile server 104. At time 10, the profile server 104 returns the actual EID 12 back to the MNO server 106. In some examples, the profile server 104 does not require the actual EID 12 and is instead configured to reserve the eSIM profile 14 to the proxy EID 13. At time 11, the LPA 44 checks the target discovery server 150 for the discovery event to see if the eSIM profile 14 is available for download, whereby the target discovery server 150 redirects the device 10 to the profile server 104 to permit the device 10 to download the eSIM profile 14 therefrom. Here, the LPA 44 may check for the discovery event using the actual EID 12 or the proxy EID 13 (when the steps at times 9 and 10 are not performed).

Figure 4B:
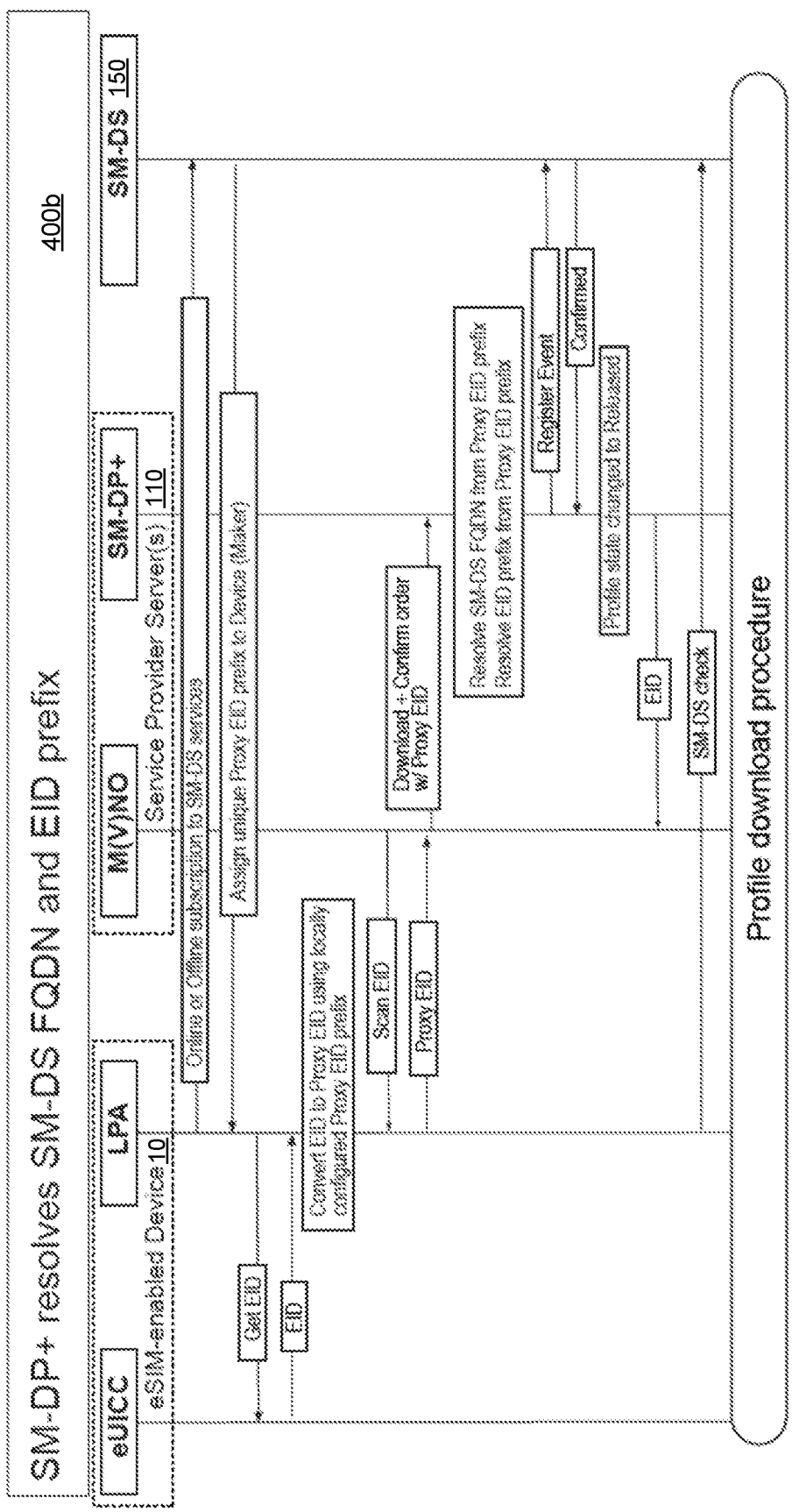

FIG. 4B is substantially similar to FIG. 4A except that when the service provider executes the DESR routine, the service provider also resolves the actual EID prefix from the proxy EID prefix in addition to resolving the address of the target discovery server. Accordingly, the service provider may register the discovery event to the target discovery server using the actual EID prefix without having to request the actual EID from the discovery server.

Figure 4C:
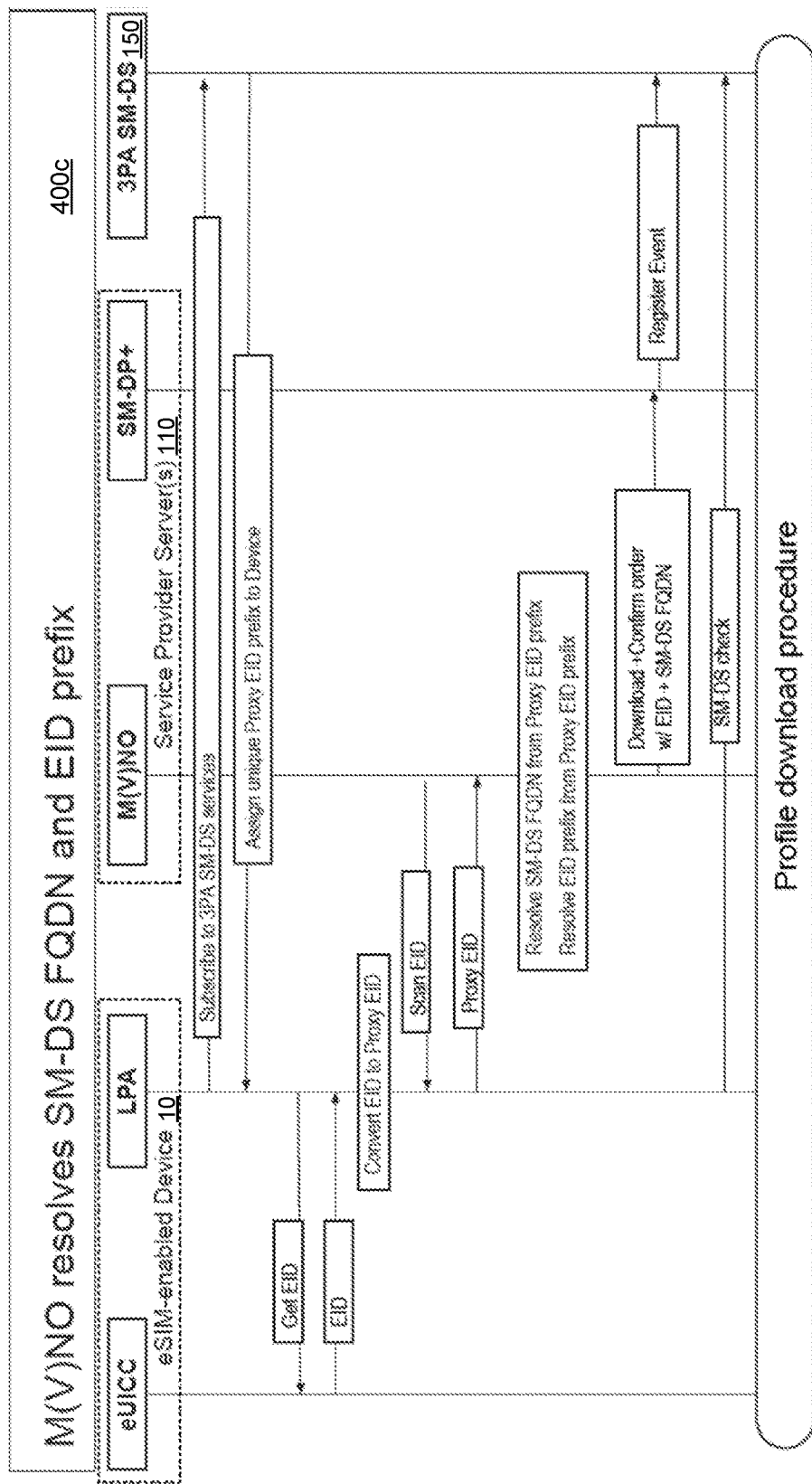
Figure 4D:
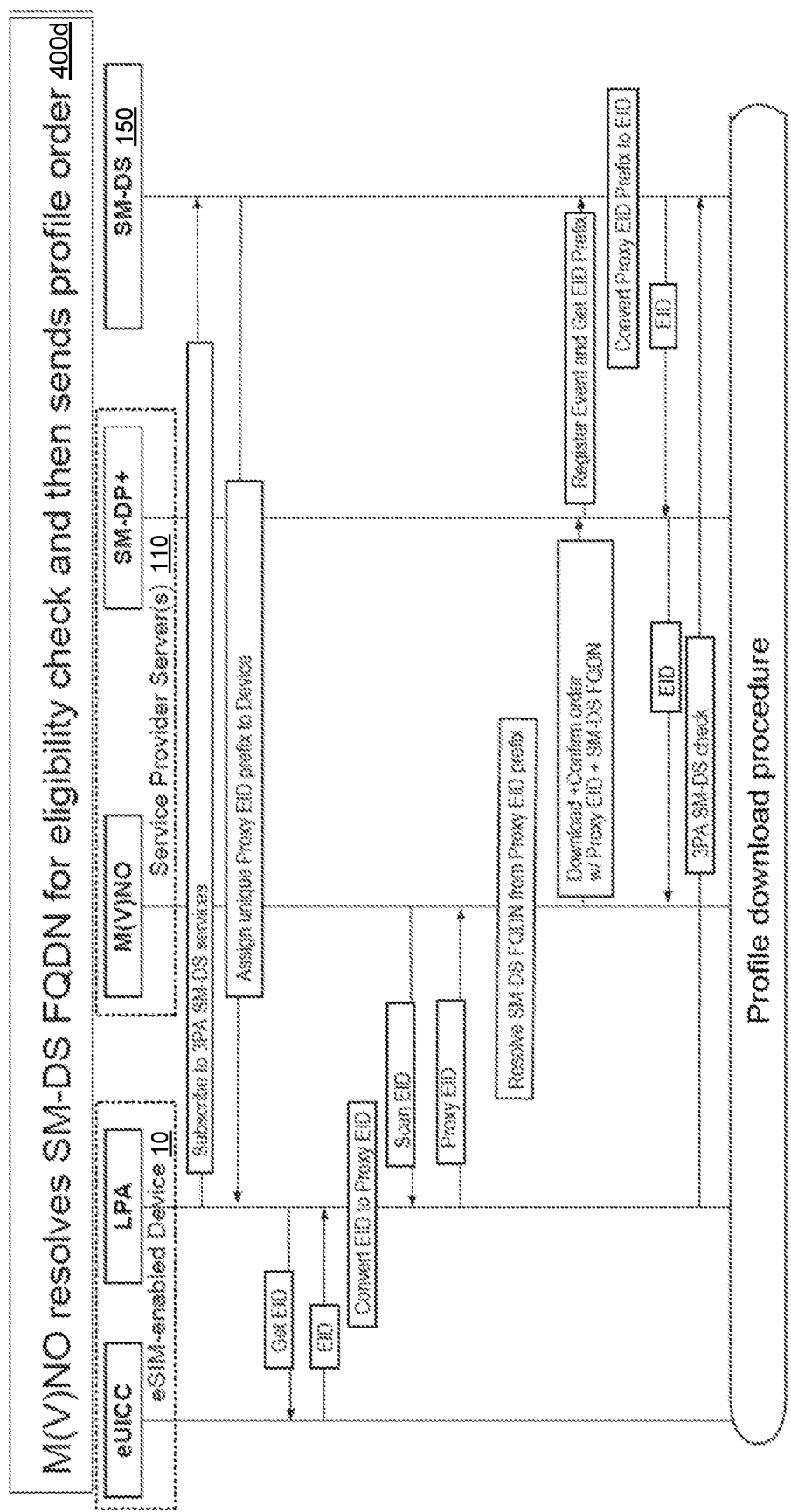

FIGS. 4C and 4D depict the MNO or MVNO server of the service provider executing the DESR routine instead of the profile server. For instance, FIG. 4C shows the MNO or MVNO server executing the DESR routine to resolve both the address of the target discovery server and the actual EID prefix from the proxy EID provided from the LPA. Similar to FIG. 4A at time 6, the MNO of the service provider server uses the resolved actual EID to issue a download and confirm order with the profile server (SM-DP+). Here, the download and confirm order includes the resolved address of the target discovery server (e.g., SM-DS FQDN) to permit the profile server to register the discovery event at the target discovery server. By contrast, FIG. 4D depicts the execution of the DESR routine at the MNO or MVNO server only resolving the address of the target discovery server (e.g., SM-DS FQDN), thereby leaving the profile server with the responsibility of obtaining the actual EID from the target discovery server with issuing the discovery event similar to FIG. 4A at time 8. Optionally, the profile server may not require the actual EID and instead reserve the eSIM profile to the proxy EID. Here, the discovery event registered to the target discovery server pairs the proxy EID with the address of the profile server such that the end user only needs to check the target discovery server for the discovery even by providing the proxy EID.

Figure 5:
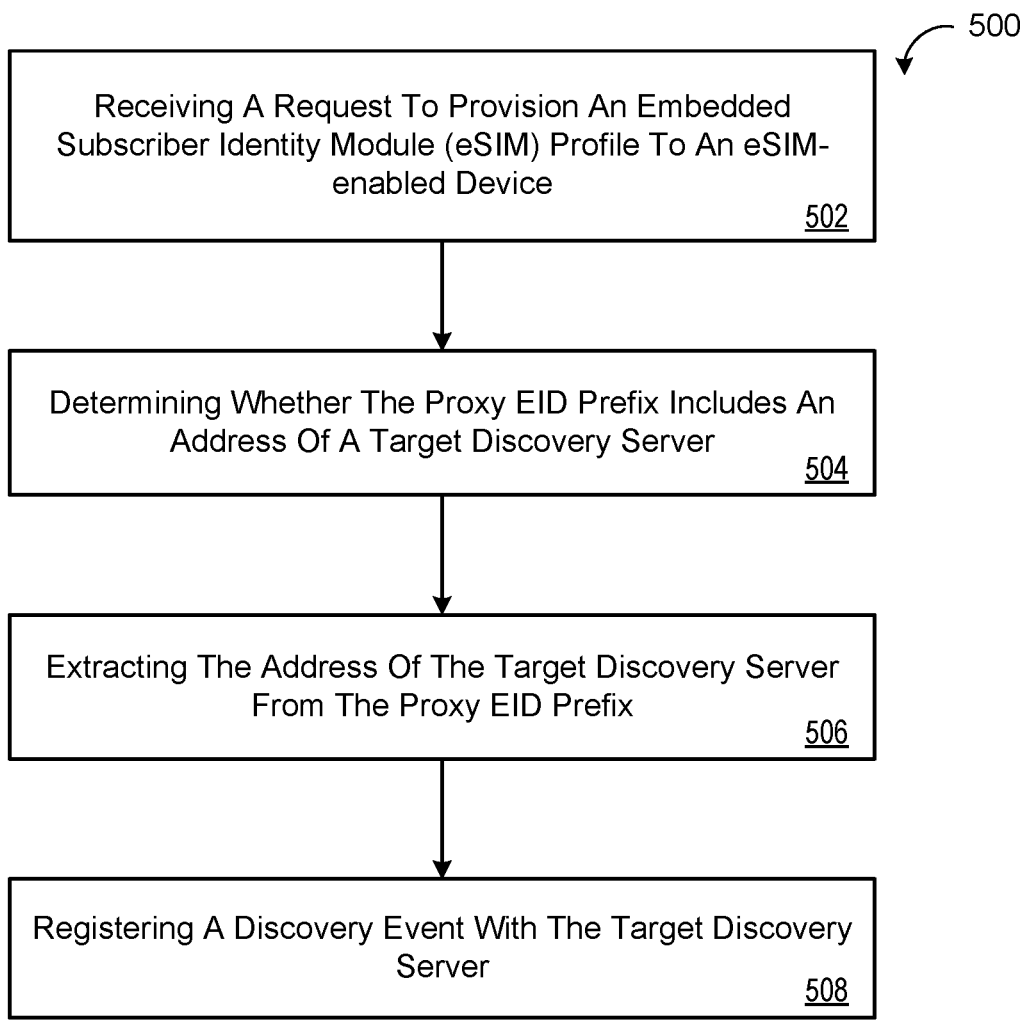
FIG. 5 is a flowchart of an example arrangement of operations for a method of contacting a prescribed profile server for downloading a corresponding eSIM profile therefrom for activation of on a new device.

FIG. 5 shows a flowchart for an example arrangement of operations for a method 500 of assigning a new eSIM-enabled device 10 a proxy EID 13 for contacting a prescribed profile server 104 for downloading a corresponding eSIM profile 14 therefrom for activation of the device 10. The method 500 may execute on the data processing hardware 610 (FIG. 6) of the service provider server 110 based on instructions stored on the memory hardware 620 (FIG. 6) of the service provider server 110. At operation 502, the method 500 includes receiving a request to provision an embedded subscriber identity module (eSIM) profile 14 to an eSIM-enabled device 10. Here, the request includes a proxy eSIM identifier (EID) prefix 13p. The eSIM profile 14 to be provisioned is associated with a service provider 102 of a mobile communication service a user of the eSIM-enabled device 10 subscribes to.

At operation 504, the method 500 includes determining whether the proxy EID prefix 13p includes an address 152 of a target discovery server 150 the eSIM-enabled device 10 is configured to connect to. At operation 506, when the proxy EID prefix 13p includes the address 152 of the target discovery server 150, the method 500 includes extracting the address 152 of the target discovery server 150 from the proxy EID prefix 13p.

At operation 506, using the address 152 of the target discovery server 150 extracted from the proxy EID prefix 13p, the method 500 includes registering a discovery event with the target discovery server 150 The discovery event indicates that the service provider 102 has reserved the eSIM profile 14 to the proxy EID 13 or an actual EID 12 assigned to the eSIM-enabled device 10.

A software application (i.e., a software resource) may refer to computer software that causes a computing device to perform a task. In some examples, a software application may be referred to as an "application," an "app," or a "program." Example applications include, but are not limited to, system diagnostic applications, system management applications, system maintenance applications, word processing applications, spreadsheet applications, messaging applications, media streaming applications, social networking applications, and gaming applications.

The non-transitory memory may be physical devices used to store programs (e.g., sequences of instructions) or data (e.g., program state information) on a temporary or permanent basis for use by a computing device. The non-transitory memory may be volatile and/or non-volatile addressable semiconductor memory. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

Figure 6:
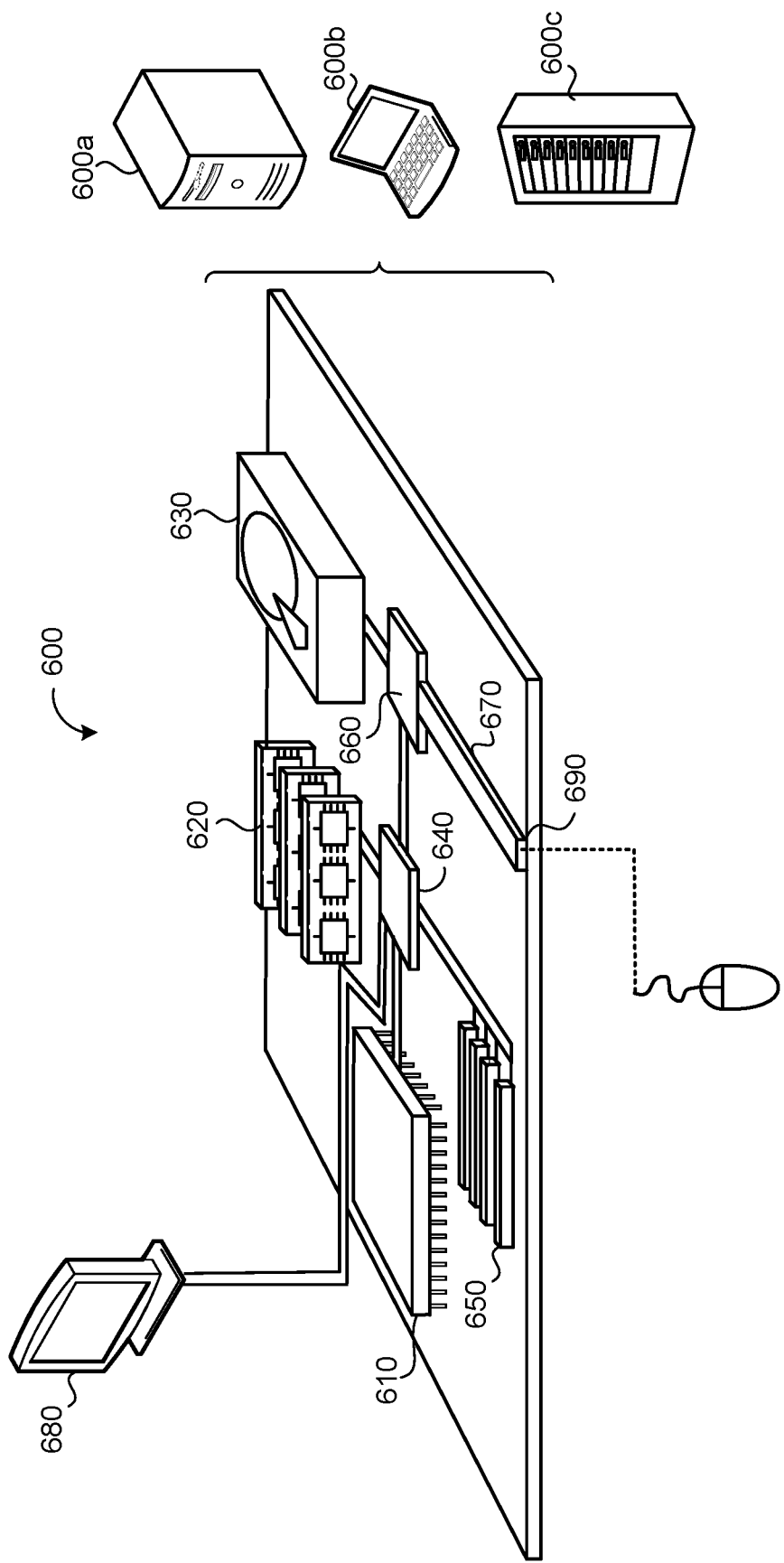
FIG. 6 is a schematic view of an example computing device that may be used to implement the systems and methods described herein.

FIG. 6 is a schematic view of an example computing device 600 that may be used to implement the systems and methods described in this document. The computing device 600 is intended to represent various forms of digital computers, such as laptops, desktops, workstations, personal digital assistants, servers, blade servers, mainframes, and other appropriate computers. The components shown here, their connections and relationships, and their functions, are meant to be exemplary only, and are not meant to limit implementations of the inventions described and/or claimed in this document.

The computing device 600 includes a processor 610, memory 620, a storage device 630, a high-speed interface/controller 640 connecting to the memory 620 and high-speed expansion ports 650, and a low speed interface/controller 660 connecting to a low speed bus 670 and a storage device 630. Each of the components 610, 620, 630, 640, 650, and 660, are interconnected using various busses, and may be mounted on a common motherboard or in other manners as appropriate. The processor (e.g., data processing hardware) 610 can process instructions for execution within the computing device 600, including instructions stored in the memory 620 or on the storage device 630 to display graphical information for a graphical user interface (GUI) on an external input/output device, such as display 680 coupled to high speed interface 640. In other implementations, multiple processors and/or multiple buses may be used, as appropriate, along with multiple memories and types of memory. Also, multiple computing devices 600 may be connected, with each device providing portions of the necessary operations (e.g., as a server bank, a group of blade servers, or a multi-processor system).

The memory (e.g., memory hardware) 620 stores information non-transitorily within the computing device 600. The memory 620 may be a computer-readable medium, a volatile memory unit(s), or non-volatile memory unit(s). The non-transitory memory 620 may be physical devices used to store programs (e.g., sequences of instructions) or data (e.g., program state information) on a temporary or permanent basis for use by the computing device 600. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

The storage device 630 is capable of providing mass storage for the computing device 600. In some implementations, the storage device 630 is a computer-readable medium. In various different implementations, the storage device 630 may be a floppy disk device, a hard disk device, an optical disk device, or a tape device, a flash memory or other similar solid state memory device, or an array of devices, including devices in a storage area network or other configurations. In additional implementations, a computer program product is tangibly embodied in an information carrier. The computer program product contains instructions that, when executed, perform one or more methods, such as those described above. The information carrier is a computer- or machine-readable medium, such as the memory 620, the storage device 630, or memory on processor 610.

The high speed controller 640 manages bandwidth-intensive operations for the computing device 600, while the low speed controller 660 manages lower bandwidth-intensive operations. Such allocation of duties is exemplary only. In some implementations, the high-speed controller 640 is coupled to the memory 620, the display 680 (e.g., through a graphics processor or accelerator), and to the high-speed expansion ports 650, which may accept various expansion cards (not shown). In some implementations, the low-speed controller 660 is coupled to the storage device 630 and a low-speed expansion port 690. The low-speed expansion port 690, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The computing device 600 may be implemented in a number of different forms, as shown in the figure. For example, it may be implemented as a standard server 600 *a* or multiple times in a group of such servers 600 *a*, as a laptop computer 600 *b*, or as part of a rack server system 600 *c*.

Various implementations of the systems and techniques described herein can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

The processes and logic flows described in this specification can be performed by one or more programmable processors, also referred to as data processing hardware, executing one or more computer programs to perform functions by operating on input data and generating output. The processes and logic flows can also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

A number of implementations have been described. Nevertheless, it will be understood that various modifications may be made without departing from the spirit and scope of the disclosure. Accordingly, other implementations are within the scope of the following claims.

What is claimed is:

1. A computer-implemented method at a user device, comprising:
receiving, from a target discovery server, a proxy embedded subscriber identity module (eSIM) identifier (EID) prefix that indicates an address of the target discovery server;
converting an EID to a proxy EID by replacing an EID prefix of the EID with the proxy EID prefix;
sending, to the target discovery server, the EID or the proxy EID to request an eSIM profile from an eSIM profile server; and
receiving, from the target discovery server, an address of the eSIM profile server for downloading the eSIM profile from the eSIM profile server.

2. The method of claim 1, wherein the target discovery server is operated by a manufacturer of the user device.

3. The method of claim 1, wherein a user of the user device subscribes to a carrier network of a service provider associated with the eSIM profile server.

4. The method of claim 3, further comprising:
sending the proxy EID to a service provider server associated with the service provider,
wherein after receiving the proxy EID, the service provider server determines the address of the target discovery server based on the proxy EID and contacts the target discovery server using the determined address to register a discovery event with the target discovery server.

5. The method of claim 4, wherein the service provider server includes the eSIM profile server.

6. The method of claim 4, wherein the discovery event specifies the address of the eSIM profile server.

7. The method of claim 6, wherein the receiving comprises:
receiving, from the target discovery server, the address of the eSIM profile server based on the EID or the proxy EID sent to the target discovery server matching device code information of the discovery event registered by the service provider server to the target discovery server.

8. The method of claim 1, wherein the converting comprises:
determining that an EID body portion of the proxy EID is as same as an EID portion of the EID.

9. The method of claim 1, wherein the proxy EID prefix indicates the address of the target discovery server by including an encoded or compressed full qualified domain name of the target discovery server.

10. The method of claim 1, wherein the proxy EID prefix indicates the address of the target discovery server based on a proxy EID to EID conversion table.

11. A user device, comprising:
processing circuitry configured to
receive, from a target discovery server, a proxy embedded subscriber identity module (eSIM) identifier (EID) prefix that indicates an address of the target discovery server,
convert an EID to a proxy EID by replacing an EID prefix of the EID with the proxy EID prefix,
send, to the target discovery server, the EID or the proxy EID to request an eSIM profile from an eSIM profile server, and
receive, from the target discovery server, an address of the eSIM profile server for downloading the eSIM profile from the eSIM profile server.

12. The user device of claim 11, wherein the target discovery server is operated by a manufacturer of the user device.

13. The user device of claim 11, wherein a user of the user device subscribes to a carrier network of a service provider associated with the eSIM profile server.

14. The user device of claim 13, wherein the processing circuitry is configured to:
sending the proxy EID to a service provider server associated with the service provider,
wherein after receiving the proxy EID, the service provider server determines the address of the target discovery server based on the proxy EID and contacts the target discovery server using the determined address to register a discovery event with the target discovery server.

15. The user device of claim 14, wherein the service provider server includes the eSIM profile server.

16. The user device of claim 14, wherein the discovery event specifies the address of the eSIM profile server.

17. The user device of claim 16, wherein the processing circuitry is configured to:
receive, from the target discovery server, the address of the eSIM profile server based on the EID or the proxy EID sent to the target discovery server matching device code information of the discovery event registered by the service provider server to the target discovery server.

18. The user device of claim 11, wherein the processing circuitry is configured to:
determine that an EID body portion of the proxy EID is as same as an EID portion of the EID.

19. The user device of claim 11, wherein the proxy EID prefix indicates the address of the target discovery server by including an encoded or compressed full qualified domain name of the target discovery server.

20. A non-transitory computer-readable medium storing instructions which when executed by an apparatus cause the apparatus to perform operations comprising:
receiving, from a target discovery server, a proxy embedded subscriber identity module (eSIM) identifier (EID) prefix that indicates an address of the target discovery server;
converting an EID to a proxy EID by replacing an EID prefix of the EID with the proxy EID prefix;
sending, to the target discovery server, the EID or the proxy EID to request an eSIM profile from an eSIM profile server; and
receiving, from the target discovery server, an address of the eSIM profile server for downloading the eSIM profile from the eSIM profile server.

* * * * *